United States Patent [19]

Kubota et al.

[11] 3,907,662
[45] Sept. 23, 1975

[54] PROCESS OF PREPARING DESULFURIZED LIGHT OIL AND FUEL GAS FROM HEAVY OIL

[75] Inventors: Takeshi Kubota, Fujiidera; Mikio Ueda, Takatsuki, both of Japan

[73] Assignee: Mitsui Shipbuilding and Engineering Co., Ltd., Tokyo, Japan

[22] Filed: Feb. 14, 1974

[21] Appl. No.: 442,427

[30] Foreign Application Priority Data
Feb. 15, 1973 Japan................................ 48-17905

[52] U.S. Cl.................... 208/53; 23/288 S; 48/105; 48/197 R; 208/127
[51] Int. Cl............................................. C10g 9/32
[58] Field of Search............................ 208/127, 53

[56] References Cited
UNITED STATES PATENTS

| | | | |
|---|---|---|---|
| 2,853,434 | 9/1958 | Moser | 208/127 |
| 2,862,871 | 12/1958 | Smith | 208/127 |
| 2,953,517 | 9/1960 | Whitely et al. | 208/127 |
| 3,661,543 | 5/1972 | Saxton | 208/127 |
| 3,803,023 | 4/1974 | Hammer | 208/127 |

Primary Examiner—Herbert Levine
Attorney, Agent, or Firm—Charles W. Helzer; Gilbert L. Wells

[57] ABSTRACT

The process of this invention comprises following steps: (1) heavy oil is converted in a low temperature coking reactor operator at 470°–550°C and including a fluidized bed containing particles of an alkali metal carbonate compound into particles of carbonaceous residue containing desulfurized decomposition gas, desulfurized light oil, particles of the alkali metal carbonate compound and volatile components; (2) at the same time a portion of the sulfur contained in the heavy oil is fixed to form an alkali metal sulfide by the action of the alkali metal carbonate compound whereby to recover the desulfurized decomposition gas and the desulfurized light oil from the raw temperature coking reactor; (3) the particles of carbonaceous substance residue containing the alkali metal carbonate compound is transferred from the low temperature coking reactor into a high temperature coking reactor including a fluidized bed; (4) the carbonaceous substance residue is treated at an elevated temperature in the bed operating at 550°–700°C for forming coke particles containing the alkali metal carbonate compound and desulfurized light substance; (5) the desulfurized light substance is admitted into the low temperature coking reactor whereby to recover the desulfurized gas and the desulfurized light oil; (6) the coke particles are transferred into an alkali metal sulfide regeneration reactor from the high temperature coking reactor; (7) the coke particles are contacted in a high temperature bed operating at 600°–800°C with high temperature fuel gas transferred from a heating and gasifying reactor thereby converting the alkali metal sulfide compound which has fixed the sulfur in the heavy oil contained in the coke particles into the alkali metal carbonate compound thus releasing the fixed sulfur as hydrogen sulfide; (8) the hydrogen sulfide containing fuel gas is recovered from the alkali metal sulfide regeneration reactor; (9) the coke particles are transferred into a heating and gasifying reactor provided with a fluidized bed; (10) most of the coke in the coke particles is converted into heated fuel gas in the fluidized bed operating at 700°–1,000°C; (11) the fuel gas is transferred into the alkali metal sulfide regeneration reactor thus recovering the fuel gas as hydrogen sulfide containing fuel gas; and (12) the alkali metal carbonate containing particles from which most of the coke has been removed are circulated through the high temperature coking reactor.

4 Claims, 2 Drawing Figures

PROCESS OF PREPARING DESULFURIZED LIGHT OIL AND FUEL GAS FROM HEAVY OIL

BACKGROUND OF THE INVENTION

This invention relates to a process and apparatus for producing desulfurized light oil from heavy oil and for gasifying the resulting coke.

Heavy oils containing a large quantity of sulfur are not suitable for use as fuel or raw material for petroleum chemistry so that in order to convert such heavy oils into high quality oils containing only a small quantity of sulfur it is necessary to suitably treat such heavy oils. Desulfurization of heavy oil is usually carried out by a hydrogenation desulfurization process but recently a gasification desulfurization process has been developed as an efficient process capable of removing at a high degree the sulfur contained in the heavy oil. The gasification desulfurization process can generally be classified into a partial oxidation process having a principal object of preparing methane gas, a hydrogenation decomposition process, a heat decomposition process for preparing pyrolyzed gas of high calorific value, and a fluidized coking gasification process which is carried out for the purpose of preparing desulfurized oil and fuel gas of low calorific value. Among these, the invention relates to the last mentioned fluidized coking gasification process. The Flexicoking Process developed by Esso Research and Engineering is a typical one of this process. According to this process raw material oil is admitted into a fluidized bed type coking reactor and decomposed on the particles constituting the fluidized bed into light decomposed oil, decomposed gas and coke. By this process, most of the sulfur contained in the raw material oil and difficult to remove is concentrated in the resulting coke but the remaining portion of the sulfur will be contained in vapour phase decomposition products (decomposition gas and decomposition oils). The vapour phase decomposition products are recovered and the coke particles are transferred to a combustion gasifying apparatus. A portion of the coke particles is burnt by oxygen or air supplied to the gasifying apparatus. At least a portion of the remaining coke particles is supplied with the heat of combustion to react with the steam supplied for producing water gas. The high temperature coke particles which were not burnt are transferred again into said fluidized bed type coking reactor to act as a heat source for the decomposition reaction which is an endothermic reaction.

However, this process has the following disadvantages.

1. It takes a long coking time. Under the same condition, the speed of the coking reaction of heavy oil is fast at the initial stage of the reaction but decreases gradually in the succeeding stage. For this reason, according to the prior art fluidized bed type coking process it has been impossible to complete the coking step unless using a stay time (coke reference) of from 20 minutes to 2 hours.

2. The resulting coke is hard and has a small surface area (low porosity).

3. The resulting coke is not suitable to burn or for carrying out water gas reaction. (at a temperature of from 900° to 1,000°C it has a tendency of converting into graphite and loses reactivity)

4. The decomposition oil is highly unsaturated and unstable at normal state (It polymerizes in the presence of oxygen, thus causing cloggings of pipes or heat exchanger, etc. In the case of a hydrogenation treatment, the catalyst is degraded severely and consumes a large quantity of hydrogen).

5. The sulfur content of the decomposed oil is still high. (Although different depending upon the type of the raw material oil, where the vacuum residue from Iranian heavy crude oil is treated, the content of sulfur in the decomposition oil amounts to about 2.0%.)

6. As the inlet port for the raw material oil is provided through the side wall of the reactor it is impossible to uniformly disperse the raw material oil and uniformly coat the coke particles in the reactor with the raw material oil with the result that large particles of coke are formed thus causing such troubles as preventing the smooth flow of the bed and deposition of the coke particles on the inner wall of the reactor. Further, non-uniform dispersion causes agglomeration of the coke particles.

7. It takes a long time for converting the heavy oil into light oil and for effecting gasification reaction. Accordingly, it is necessary to use a reactor of a large volume.

8. As the resulting coke particles are transferred at a temperature of about 500°C through a transfer pipe from the fluidized bed type coking reactor to the combustion vessel, the coke particles tend to agglomerate in the transfer pipe.

9. The fluidized bed type coking reactor is usually provided at its upper portion with a large scrubbing fractionation tower for the purpose of removing fine floating particles so that the overall height of the reactor is extremely high.

It is also been proposed a process of gasifying coal and heavy oil or a process of converting coal or heavy oil into light oil in the presence of an alkali metal compound, for example, caustic soda or potassium carbonate. According to our experiment when sulfur containing heavy oil is subjected to a coking treatment in the presence of an alkali metal compound, due to the dehydrogenation catalytic action and the desulfurization action exhibited by the alkali metal compound, the compound which is gaseous under normal state among vapour phase decomposition products contains hydrogen at a high concentration. By suitable selection of the conditions such gas can be made to be essentially free of sulfur. Products which are liquid under normal state take the form of stable oils of low degree of unsaturation from which sulfur has been nearly completely removed. Further, the resulting coke has larger surface area (more porous) than the coke produced by the prior art coking process and shows a small tendency of converting into graphite at the time of high temperature treatment (800°–1,000°C). Thus, it was confirmed that the resulting coke contains an extremely large quantity of oxygen. In other words, the resulting coke is not suitable to use as the raw material for preparing graphite but it is considered that it is most suitable to use as the raw material for preparing active carbon or for preparing water gas by a high temperature reaction. In fact, the result of our research shows that the resulting coke has much superior characteristics than the product prepared by the conventional fluidized bed type coking process.

Considering above described facts and public hazards we have made a large effort for developing an improved fluidized bed type coking gasification process which is deemed most suitable for the Japanese state of energy among various gasification and desulfurization processes. As a result, we have succeeded to develop a valuable process and apparatus capable of eliminating various defects of prior art processes and of efficiently removing sulfur content of heavy oils.

SUMMARY OF THE INVENTION

In accordance with one aspect of this invention, there is provided a process of preparing desulfurized light oil and fuel gas from heavy oil by using an alkali metal carbonate compound, characterized by the steps of converting raw material heavy oil in a low temperature coking reactor operating at a temperature of from 470° to 550°C and including a fluidized bed containing particles of an alkali metal carbonate compound into particles of carbonaceous residue containing desulfurized decomposition gas, desulfurized light oil, particles of said alkali metal carbonate compound and an appreciable quantity of volatile components; simultaneously fixing a portion of the sulfur contained in the raw material heavy oil to form an alkali metal sulfide by the action of the alkali metal carbonate compound whereby to recover the desulfurized decomposition gas and the desulfurized light oil from the low temperature coking reactor; transferring the particles of carbonaceous substance residue containing the alkali metal carbonate compound from the low temperature coking reactor into a high temperature coking reactor including a fluidized bed; treating at an elevated temperature the carbonaceous substance residue in the bed operating at a temperature of from 550° to 700°C for forming coke particles containing the alkali metal carbonate compound and desulfurized light substance; admitting the desulfurized light substance into the low temperature coking reactor whereby to recover the desulfurized gas and desulfurized light oil, transferring the coke particles into an alkali metal sulfide regeneration reactor from the high temperature coking reactor; contacting the coke particles in a high temperature bed operating at a temperature of from 600° to 800°C with high temperature fuel gas transferred from a heating and gasifying reactor thereby converting the alkali metal sulfide compound which has fixed the sulfur in the raw material heavy oil contained in the coke particles into the alkali metal carbonate compound thus releasing the fixed sulfur as hydrogen sulfide; recovering hydrogen sulfide containing fuel gas from the alkali metal sulfide regeneration reactor; transferring the coke particles into a heating and gasifying reactor provided with a fluidized bed; converting most of the coke in the coke particles into heated fuel gas in the fluidized bed operating at a temperature of from 700° to 1,000°C; transferring the fuel gas into the alkali metal regeneration reactor thus recovering the fuel gas as hydrogen sulfide containing fuel gas; and recirculating the alkali metal carbonate containing particles from which most of the coke has been removed through the high temperature coking oven.

The apparatus for carrying out the process just described comprises a low temperature coking reactor, a high temperature coking reactor located thereunder, an alkali metal sulfide regeneration reactor and a heating and gasifying reactor located beneath the alkali metal sulfide regeneration reactor.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
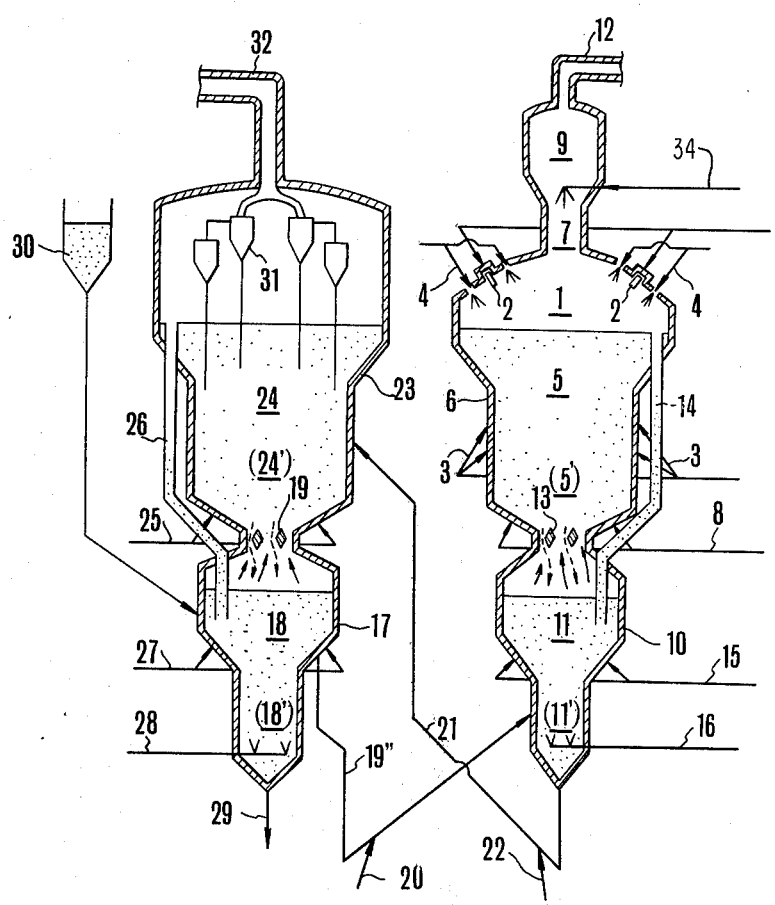
FIG. 1 is a diagrammatic representation of the apparatus constructed in accordance with the teaching of this invention and FIG. 2 is a similar view in which typical dimensions and operating conditions are illustrated.

Referring now to FIG. 1 of the accompanying drawings, the reaction apparatus illustrated therein comprises coking reactors 6 and 10, an alkali metal sulfide regenerating reactor 23 and a heating and gasification reactor 17, etc. The coking reactor comprises the upper low temperature coking reactor 6 and the lower high temperature coking reactor 10 and this construction is used for the purpose of reducing the reaction time required by the prior art fluidizing bed type coking reactors and of greatly increasing the quantity of desulfurized oil recovered. Each reactor has a peculiar configuration wherein the cross-sectional area is increased in the upper portion, the operation and arrangement of these reactors characterizing the process of this invention. The process and operation of the apparatus embodying the invention will be described in detail hereunder.

As shown, the low temperature coking reactor 6 has a large cross-sectional area at its upper portion and the fluidized bed 5 is maintained at a suitable fluidized state by the steam supplied through a pipe 8 and the resulting vapour phase conveyed from the bed 11 of the high temperature coking reactor. A portion of the raw material heavy oil is admitted through line 34 together with the steam while another portion thereof is admitted through spray nozzles 2 mounted on the head of the reactor. The remaining portion of the heavy oil is supplied through the side surface of the reactor via pipes 3. About the nozzles 2 are provided a plurality of steam ejecting nozzles 4 to eject a suitable quantity of steam into the reactor thus preventing deposition of the coke on the inner wall of the reactor. The temperature of the space 1 to which the sprays of the raw material are supplied is maintained at a temperature between 350°C and 500°C by the steam. The raw material heavy oil admitted in this manner is dispersed uniformly in the bed 5 of the low temperature coking reactor for coating the surface of a substance consisting essentially of an alkali carbonate compound constituting the bed. As will be described later, the compound is circulated and supplemented from heated gasification reactor 17 through high temperature coking reactor 10. The raw material heavy oil is converted into a vapour phase and a carbonaceous residue (which still contains a substantial quantity of volatile components) by giving its heat to the surface of the coke particles. The decomposition and coking reaction of the raw material heavy oil is accelerated by the dehydrogenation action and the desulfurization action of the alkali carbonate compound contained in the particles for the heavy oil, and during this process, the sulfur contained in the raw material heavy oil is fixed to form an alkali sulfide. In the case of sodium carbonate, this Iranian heavy crude oil sulfur fixing reaction proceeds in follows.

$$Na_2CO_3 + S \text{ (in the heavy oil)} \rightarrow Na_2S + CO_2 + H_2O \quad (1)$$

In cooperation with the high temperature coking reactor 10, the operating temperature of the bed 5 of the low temperature coking reactor and the average stay time of the resulting carbonaceous residue in the bed 5 act to limit the quantity of the decomposition gas formed, increase as far as possible the quantity of the desulfurized oil recovered and reduce the treating time in the coking section, (which has been a defect of the prior art process). For this reason, the operating temperature of bed 5 is selected to be from 470° to 550°C and the average stay time to be from 5 to 10 minutes.

More particularly, the decomposition and coking reaction of heavy oil in a conventional range of the coking temperature, and at the initial stage of decomposition in our experiment, proceeds at a relatively high speed to form and distill the vapour phase of light oil but the decomposition speed of the carbonaceous substance which is gradually concentrated decreases gradually so that it takes a considerably long period before complete conversion into coke. Accordingly, in the prior art process utilizing the same reactor, it was necessary to operate at a temperature of from 500° to 550°C and with a stay time (reference of the coke formed) of from 20 minutes to 2 hours, thereby increasing the quantity of the decomposition gas formed. For this reason, according to this invention, the coking reactor is divided into the low temperature coking reactor and the high temperature coking reactor. In the former, only the portion of the raw material which is easy to decompose is decomposed rapidly, whereas in the latter the concentrated carbonaceous residue is subjected to the high temperature decomposition and coking reaction thus eliminating the prior art defects. The decomposition vapour phase formed in the bed 5 of the low temperature coking reactor 6 is admixed with the vapour phase formed in the bed 11 of the high temperature coking reactor 10 and the mixture passes through space 1 into which the raw material oil is sprayed and through a throat 7 into which especially heavy fraction of the desulfurized oil which has been recovered through a decomposed vapour phase recovering pipe or a mixture of said heavy fraction and the raw material heavy fraction from line 34 is sprayed at a high speed, the throat 7 being maintained at a temperature of from 300° to 450°C. After cooling and washing, the mixture passes through a decelerating chamber 9 to reduce its flow speed, and then recovered through the decomposed vapour phase recovering pipe 12. Where the deposition of coke on the surfaces of the throat 7 and the decelerating champer 9 is extremely large, the heavy oil from line 34 may be sprayed onto these wall surfaces to make them flowable and wet thereby preventing the deposition of coke on these surfaces. By using the high speed cooling, the washing step and the deceleration chamber described above, it is possible to recover the vapour phase produced at a clean state. The carbonaceous particles in the bed 5 consisting essentially of the particles of an alkali metal carbonate compound whose surfaces are deposited with the carbonaceous residue are collected at the classifying section 5' of the bed 5 by the classifying action of the fluidized bed, and a portion of the collected particles pass through the gaps of a bed supporting structure 13 and then fall by gravity on the bed 11 of the high temperature coking reactor 10. A downcomer 14 is provided for the purpose of maintaining the volume of the bed 5 of the low temperature coking reactor 6 at a constant value so that the level of the bed 5 is always maintained at the constant level. The provision of the classifying section 5' promotes vertical motion of the particles in the beds 5 and 11 thus maintaining the surface of the particles in the bed always at dried state, thus preventing agglomeration of the particles.

As shown, the high temperature coking reactor 10 is constructed to have a large cross-sectional area at its upper portion and its bed 11 is maintained in a suitable fluidized condition by the steam supplied through pipes 15 and 16. The particles coated with the carbonaceous substance and transferred by gravity from the bed 5 of the low temperature coking reactor 6 mounted on the high temperature coking reactor 10 still contain a substantial quantity of volatile components. After being received in bed 11, the particles are conveyed to the classifying section 11' of the bed 11 by the classifying action thereof. During this time the particles undergo high temperature pyrolysis coking reaction to form vapour phase products and coke. The vapour phase products formed by the decomposition reaction at the classifying section 11' of the bed 11 are desulfurized while they pass through the particles consisting essentially of an alkali metal carbonate compound. At this time, a portion of the particles passes through the gaps of the bed supporting structure 13 together with the vapour phase products into the bed 5 of the low temperature coking reactor 6. As a result, the particles and the vapour phase always flow between the bed 5 of the low temperature coking reactor and the bed 11 of the high temperature coking reactor through the bed supporting structure 13. Thus, the large particles of the carbonaceous substance formed in the bed 5 of the low temperature coking reactor move downwardly under gravity into the bed 11 of the high temperature coking reactor, whereas the vapour phase formed in the bed 11 of the high temperature coking reactor flows upwardly into the bed 5 of the low temperature coking reactor together with a portion of the particles consisting essentially of the alkali metal carbonate compound contained in the bed 11. The major portion of the particles consisting essentially of the alkali metal carbonate compound and existing in the bed 11 of the high temperature coking reactor is supplied from the bed 18 of a heating and gasification reactor 17. The particles are admitted into the classifying section 11' of the high temperature coking reactor 10 from the bed 18 through a pipe 19'', such transfer being accelerated by the steam supplied through a pipe 20. The particles thus transferred give their heat to the particles contained in the bed 11 and are then collected at the upper portion of the fluidized bed 11 by the classifying action thereof.

According to the method of this invention, the temperature of the bed 11 of the high temperature coking reactor 10 is maintained in a range of from 550° to 700°C. The average stay time of the particles in bed 11 (the reference of the coke formed) is maintained in the range of from 5 to 10 minutes. At this time, the conversion reaction of the raw material heavy oil into light oil and coke is completed thus enabling to recover the desulfurized oil in the vapour phase at a higher quantity and efficiency than the prior art process.

A portion of coke particles of increased size (consisting essentially of particles of the alkali metal carbonate compound coated with coke) collected at the classifying section 11' of the high temperature coking reactor is transferred into the bed 24 of an alkali metal regeneration reactor 24 through a pipe 21 together with propelling steam suppled by pipe 22.

As shown, the alkali metal regeneration reactor 23 is constructed to have a large cross-sectional area at its upper portion and the bed 24 therein is maintained at a suitable fluidized condition by the steam supplied through pipe 25 and a high temperature oxidized carbon containing gas transferred from the bed 18 of a heated gasifier 17 located at the bottom through the gaps of a bed supporting structure 19. The temperature of the bed 24 is maintained at a temperature of from 600° to 800°C by the heat of the oxidized carbon containing gas transferred to the bed and of the high temperature particles consisting essentially of the alkali metal carbonate compound accompanied by the oxidized gas containing gas. The large size coke particles transferred from the bed 11 of the high temperature coking reactor 10 are heated to this temperature and collected at the classifying section 24' of the fluidized bed 24 by the classifying action thereof. The particles consisting of the alkali metal carbonate compound and transferred from the bed 18 of the heating and gasifying reactor together with the resulting oxidized carbon containing gas are collected in the upper layer of the bed 24. A downcomer 26 is provided for the alkali metal sulfide regeneration reactor 23 for the purpose of maintaining the reaction volume at a constant value so that a portion of the particles in the upper layer of the bed 24 passes through the downcomer 26, whereas the large size coke particles heated in the classifying section pass through the gaps of the bed supporting structure 19 and then fall by gravity on the bed 18 of the heating and gasification reactor. By these processes, the average stay time of the large coke particles in bed 24 is maintained in a range of from 5 to 20 minutes.

At least a portion of the particles presenting in the bed 24 of the alkali metal sulfide regeneration reactor is presenting in the form of an alkali metal sulfide due to the desulfurization reaction described by equation (1) and occuring in the coking reaction zone. In order to cyclically use such compound in the method and apparatus of this invention it is necessary to regenerate the alkali metal carbonate compound. According to this invention this regeneration reaction is performed in the bed 24. In the case of sodium sulfide, the following reaction is used

$$Na_2S + CO_2 + H_2O \rightleftarrows Na_2CO_3 + H_2S$$

(2)

The $CO_2$ and $H_2O$ necessary for this reaction are supplied by the gas which passes through the gaps of the bed supporting structure 19 from the bed 18 of the heating and gasification reactor 17. If necessary, the steam supplied from the bottom of the alkali metal sulfide regeneration reactor through a pipe 25 may be used as a portion of the source of $H_2O$. According to the theory of equilibrium, in this reaction a reverse reaction mainly occurs so that in this invention, the temperature of the bed 24 is maintained in a range of from 600° to 800°C as has been described hereinabove.

Hydrogen sulfide formed by the regeneration of the alkali metal sulfide compound and the oxidized gas containing gas transferred from the bed of the heating and gasifying reactor pass through cyclones 31 in the reactor 23 and then recovered through the gas recovering pipe 32.

As shown, the heating and gasifying reactor 17 is constructed to have a large cross-sectional area at its upper portion, and the bed 18 thereof is maintained at a suitable fluidized condition by the steam supplied through a pipe 27 and the steam and oxygen or are supplied through a pipe 28. The heated large size particles of coke supplied by gravity through the gaps of the bed supporting structure 24 of the alkali metal sulfide regeneration reactor 23 are collected at the classifying section 18' of the bed 18 by the classifying action thereof while the particles consisting of the alkali metal carbonate compound and passing through the downcomer 26 are collected on the upper portion of the bed 18. In this bed, at least a portion of the coke formed in the coking reaction region is burnt by the oxygen supplied to maintain the temperature of the bed 18 at a temperature between 700° to 1,000°C. The heat generated by the combustion of the coke is utilized in the reaction of converting the remaining portion of the coke into water gas and is also utilized as the heat source for other reactors described above. The water gas forming reaction proceeds at a speed about 10 times faster than that of the conventional process due to the catalytic action of the alkali metal carbonate compound used, thus consuming substantially all of the remaining coke. Thus, the particles consisting essentially of the alkali metal carbonate compound from which the coke has been removed are collected in the upper layer of the fluidized bed 18 by the classifying effect thereof, and a portion of the upper layer is transferred to the classifying section 11' of the high temperature coking reactor 10 through transfer pipe 19'' together with the propelling steam supplied through pipe 20 to be used cyclically.

The temperature of the apparatus is adjusted in the following manner. Assuming that the temperature of the bed 5 of the low temperature coking reactor increases, this temperature of the bed 5 is detected to decrease the quantity of the propelling steam. Conversely, upon decrease of the temperature of the bed 5, the quantity of the propelling steam flowing through the propelling pipe 19'' is increased. Where the temperature of the bed 24 of the alkali metal sulfide regeneration reactor increases the temperature is detected for decreasing the quantity of the oxygen supplied through pipe 28. Conversely, when the temperature decreases the quantity of the oxygen is increased.

The adjustment of the level in the apparatus is performed in the following manner. Thus, increase in the level of the bed 11 in the high temperature coking reactor is detected by a suitable detector thus increasing the quantity of the propelling steam supplied to the transfer pipe 21. Conversely, upon decrease in the level the quantity of the propelling steam is decreased. Further, when the level of the bed 18 in the heating and gasification reactor rises, this rise is detected for discharging the particles to the outside of the system through an exhaust pipe 29. Conversely, when the level lowers the particles consisting essentially of the alkali metal carbonate compound are supplied from a hopper 30 into the bed 18 of the heating and gasification reactor.

The particles exhausted out of the system in this manner contain concentrated metal components such as nickel, vanadium, etc., contained in the raw material heavy oil. Although not shown, a cooling coil may be disposed in bed 24 to recover the heat formed by burning an excessive quantity of coke particles in the heating and gasification reactor. By increasing the reaction pressure, it is also possible to prepare methane rich fuel gas.

In addition to the alkali metal carbonate compound described above, other particles having desulfurization effect, for example time, dolomite ($CaO$-$MgO$) etc. can also be used.

EXAMPLE

Figure 2:
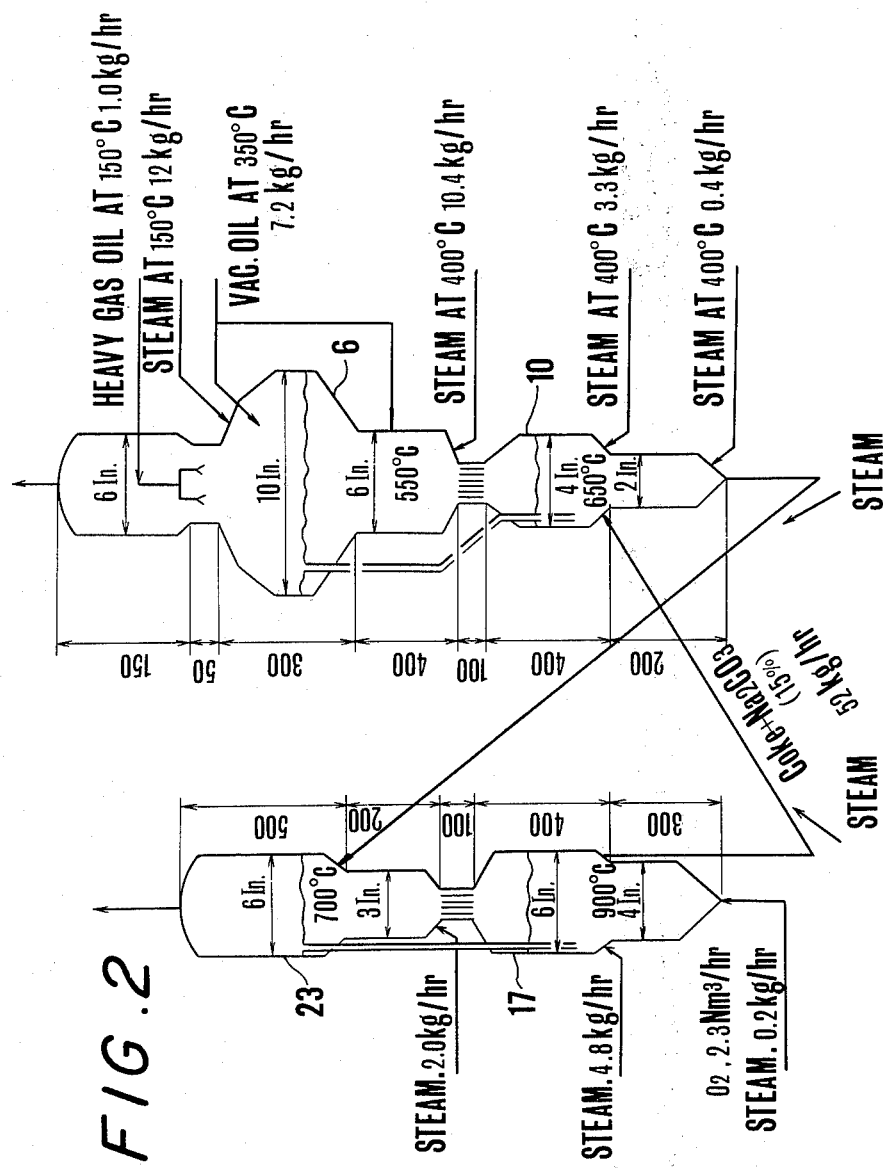

The outline and the dimensions of the apparatus utilized for carrying out the invention are illustrated in FIG. 2 together with the quantities of various raw materials and the temperatures at various portions of the apparatus. For simplicity, valves, meters or the like are not shown.

The result of operation of the apparatus under the conditions illustrated was satisfactory and the adjustment of the temperature at various portions was also satisfactory. The characteristics of the raw material, the composition of the product under normal condition and the balance of the materials are as follows.

1. Raw material: Vacuum residue from Iranian heavy crude oil
2. Characteristics of the raw material
   - Softening Point: 41.8°C
   - Specific gravity: 0.82 (90/4°C)
   - Sulfur component: 3.58 weight percent
   - Asphalten component: 19.3 weight percent
   - Conradson residue: 21.4 weight percent
3. Balance of the Materials
   Coking section
   - Gas formed: 10.5 weight percent (decomposition gas)
   - $C_5$ to 220°C fractions: 19.2 weight percent
   - Fractions of above 220°C: 42.3 weight percent
4. Composition of the products
   Distilled oil
   - sulfur content: 0.71 weight percent
   Decomposition gas
   - $H_2$: 65.3 mole %
   - $CH_4$: 18.6 "
   - $C_2H_4$: 2.9 "
   - $C_2H_6$: 5.4 "
   - $C_3$: 4.1 "
   - $C_4$: 2.2 "
   - $C_5^+$: 1.4 "
   - $H_2S$: 0.1 "
   - $CO_2$: trace
   Fuel gas
   - $CO_2$: 31.9 mole %
   - $CO$: 51.2 "
   - $H_2$: 10.8 "
   - $CH_4$: 2.2 "
   - $H_2S$: 3.9 "

What is claimed is:

1. In a process of preparing desulfurized light oil and fuel gas from heavy oil by using an alkali metal carbonate compound, the improvement comprising the steps of converting raw material heavy oil in a low temperature coking reactor operating at a temperature of from 470° to 550°C and including a fluidized bed containing particles of an alkali metal carbonate compound into particles of carbonaceous residue containing desulfurized decomposition gas, desulfurized light oil, particles of said alkali metal carbonate compound and an appreciable quantity of volatile components; simultaneously fixing a portion of the sulfur contained in said raw material heavy oil to form an alkali metal sulfide by the action of said alkali metal carbonate compound to recover said desulfurized decomposition gas and said desulfurized light oil from said low temperature coking reactor; transferring said particles of carbonaceous substance residue containing said alkali metal carbonate compound from said low temperature coking reactor into a high temperature coking reactor including a high temperature fluidized bed; treating at an elevated temperature said carbonaceous substance residue in said high temperature fluidized bed operating at a temperature of from 550° to 700° C, forming coke particles containing said alkali metal carbonate compound and desulfurized light substance; admitting said desulfurized light substance into said low temperature coking reactor to recover desulfurized gas and desulfurized light oil; transferring said coke particles into an alkali metal sulfide regeneration reactor from said high temperature coking reactor; contacting said coke particles in a high regeneration bed operating at a temperature of from 600° to 800°C with high temperature fuel gas transferred from a heating and gasifying reactor thereby converting said alkali metal sulfide compound which has fixed the sulfur in the raw material heavy oil contained in said coke particles into the alkali metal carbonate compound thus releasing the fixed sulfur as hydrogen sulfide; recovering hydrogen sulfide containing fuel gas from said alkali metal sulfide regeneration reactor; transferring said coke particles into a heating and gasifying reactor provided with a gasifying fluidized bed; converting most of the coke in the coke particles into heated fuel gas in said gasifying fluidized bed operating at a temperature of from 700° to 1,000°C; transferring said fuel gas into said alkali metal sulfide regeneration reactor thus recovering said fuel gas as hydrogen sulfide containing fuel gas; and recirculating the alkali metal carbonate containing particles from which most of the coke has been removed through said high temperature coking reactor.

2. The process according to claim 1, said process comprising the steps of transferring small particles to the upper layer of respective reactors and large particles to the classifying section of the reactors by utilizing the classifying function of the fluidized bed, transferring by gravity large particles collected at the classifying section in the upper reactor into the lower reactor and transferring small particles collected in the upper layer of the lower reactor into the upper reactor by the vapour phase formed between the low temperature coking reactor and the high temperature coking reactor and between the alkali metal sulfide regeneration reactor and the heating and gasifying reactor thereby supplying necessary quantities of the particles and heat.

3. The process according to claim 1 wherein a portion of the raw material heavy oil is supplied into the low temperature coking reactor through a nozzle on the head thereof, and a portion of the raw material heavy oil is supplied through a nozzle on the side wall of said reactor thus improving the dispersion of the heavy oil through the particles.

4. The process according to claim 1 wherein in the upper portion of the low temperature coking reactor are provided a steam admission region, a decomposition gas oil spray region, and a deceleration chamber thus effecting cooling and washing of the desulfurized decomposition products.

* * * * *